(12) United States Patent
Motoki

(10) Patent No.: US 7,903,358 B2
(45) Date of Patent: Mar. 8, 2011

(54) DATA STORAGE DEVICE

(75) Inventor: Masaaki Motoki, Higashine (JP)

(73) Assignee: Toshiba Storage Device Corporation, Tokyo (JP)

( * ) Notice: Subject to any disclaimer, the term of this patent is extended or adjusted under 35 U.S.C. 154(b) by 268 days.

(21) Appl. No.: 12/353,745

(22) Filed: Jan. 14, 2009

(65) Prior Publication Data

US 2009/0290245 A1 Nov. 26, 2009

(30) Foreign Application Priority Data

May 23, 2008 (JP) .................................. 2008-135574

(51) Int. Cl.
*G11B 5/86* (2006.01)
(52) U.S. Cl. ........................................................ 360/15
(58) Field of Classification Search ................. 360/15, 360/53; 711/103, 122; 707/201; 709/219; 714/763, 42; 345/519; 379/279
See application file for complete search history.

(56) References Cited

U.S. PATENT DOCUMENTS

| | | | | |
|---|---|---|---|---|
| 3,636,262 | A * | 1/1972 | Johnson ........................ | 379/279 |
| 5,584,012 | A * | 12/1996 | Kojima et al. ................ | 711/122 |
| 6,516,440 | B1 * | 2/2003 | Teradaira ...................... | 714/763 |
| 7,073,017 | B2 * | 7/2006 | Yamamoto ..................... | 711/103 |
| 7,667,707 | B1 * | 2/2010 | Margulis ....................... | 345/519 |
| 7,689,869 | B2 * | 3/2010 | Terashita et al. ................ | 714/42 |
| 2005/0033828 | A1 * | 2/2005 | Watanabe ..................... | 709/219 |
| 2006/0245322 | A1 | 11/2006 | Akahosshi et al. | |
| 2006/0277226 | A1 * | 12/2006 | Chikusa et al. ............... | 707/201 |
| 2008/0189476 | A1 * | 8/2008 | Ishimoto et al. .............. | 711/103 |

FOREIGN PATENT DOCUMENTS

| | | |
|---|---|---|
| JP | A 2004-319080 | 11/2004 |
| JP | A 2005-165664 | 6/2005 |
| JP | A 2005-322287 | 11/2005 |
| JP | A 2006-262402 | 9/2006 |
| JP | A 2006-309866 | 11/2006 |

\* cited by examiner

*Primary Examiner* — Fred Tzeng
(74) *Attorney, Agent, or Firm* — Greer, Burns & Crain, Ltd.

(57) ABSTRACT

A data storage device includes: a recording medium that has two or more system data recording areas where system data are recorded on a multiple basis, and a user data recording area where user data is recorded; a head that writes and reads data into and from the recording medium; and a system data update control section that causes the head to update the system data on the recording medium. The system data update control section causes the head to record new system data on a multiple basis in another sub-record area that is alternately selected at each update to the new system data over the two or more system data recording areas when each the two or more system data recording areas is divided into two sub-record areas, and read the new system data from the another sub-record area to confirm that the new system data is recorded correctly.

14 Claims, 10 Drawing Sheets

FIG. 6A

| MULTIPLEX AREAS | 310A | 320A | 330A | 340A | 310B | 320B | 330B | 340B | NORMAL NUMBER |
|---|---|---|---|---|---|---|---|---|---|
| WRITE RESULTS | 01 | 01 | 01 | 01 | 01 | 01 | 01 | 01 | 08 |
| VERIFY RESULTS | 01 | 01 | 01 | 01 | 01 | 01 | 01 | 01 | 08 |

FIG. 6B

| MULTIPLEX AREAS | 310A | 320A | 330A | 340A | 310B | 320B | 330B | 340B | NORMAL NUMBER |
|---|---|---|---|---|---|---|---|---|---|
| WRITE RESULTS | 00 | 01 | 01 | 01 | 01 | 01 | 01 | 01 | 07 |
| VERIFY RESULTS | 01 | 01 | 01 | 01 | 01 | 01 | 01 | 01 | 08 |

FIG. 6C

| MULTIPLEX AREAS | 310A | 320A | 330A | 340A | 310B | 320B | 330B | 340B | NORMAL NUMBER |
|---|---|---|---|---|---|---|---|---|---|
| WRITE RESULTS | 00 | 01 | 01 | 01 | 01 | 01 | 01 | 01 | 07 |
| VERIFY RESULTS | 00 | 01 | 01 | 00 | 01 | 01 | 01 | 01 | 07 |

FIG. 6D

| MULTIPLEX AREAS | 310A | 320A | 330A | 340A | 310B | 320B | 330B | 340B | NORMAL NUMBER |
|---|---|---|---|---|---|---|---|---|---|
| WRITE RESULTS | 00 | 01 | 01 | 01 | 00 | 00 | 00 | 01 | 04 |
| VERIFY RESULTS | 00 | 01 | 01 | 00 | 00 | 00 | 00 | 01 | 03 |

DATA STORAGE DEVICE

CROSS-REFERENCE TO RELATED APPLICATIONS

This application is based upon and claims the benefit of priority of the prior Japanese Patent Application No. 2008-135574, filed on May 23, 2008, the entire contents of which are incorporated herein by reference.

FIELD

The present embodiments discussed herein are directed to a data storage device that stores system data on a multiplexing basis.

BACKGROUND

Volume of information keeps increasing along with the development of the information society. The development of a large capacity and a low-priced memory is demanded in accordance with the increase of the volume of information. Particularly, the magnetic disk to which the information access is done in the magnetic field is paid to attention as high density storage medium that is rewritable in information. The research and development for a magnetic disk unit which incorporates the magnetic disk and a head, and accesses the magnetic disk information by the head is done actively for making to a large capacity further.

The magnetic disk unit is often used in such a way that it is installed in electronic equipment such as personal computers and the server devices. The magnetic disk records thereon the system data composed of the serial number of the device, management information that indicates the defect area in the user area, the password for security, and the log of the access error, in addition to the user data that is the object of the information access. Usually, there is prepared the system area on which the system data is recorded in the most outer and inner of the magnetic disk, and the information access is executed for the system area when the password is changed by the user or the access error occurs, so that the system data is updated.

When the power supply of electronic equipment is turned on, the system data recorded on the magnetic disk is first read, and the password and management information, etc. are acquired, and here, they are used to activate the electronic equipment. Therefore, when the system data recorded in the system area is destroyed at the time when data is updated, the electronic equipment might not be able to be activated. Especially, in recent years, in order to improve the capacity of the magnetic disk unit, increasing TPI (number of tracks per an inch) of the magnetic disk is done. Narrowing the distance (track pitch) between the adjacent tracks causes the access error to the system area to occur easily.

As a method of solving such a problem, it is considered to apply the verify processing in which the data newly written is read after data is updated to confirm the presence of the error, and in the event that the error occurs, correct data is written again (For instance, refer to Japanese Laid-open Patent Publication No. 2004-319080). Moreover, it is widely performed that two or more system areas are prepared on the magnetic disk for the record of the system data, and the system data is recorded in those two or more system areas on a multiple basis. Applying multiplexing of these system data and verify processing makes it possible to improve the reliability of the data update, and in addition even if one system area is destroyed, it is possible that electronic equipment can be started by reading the system data recorded in another system area.

However, in a case where that both the multiplexing of the system data and the verify processing are simultaneously applied, it is necessary to execute both writing and reading of data whenever data is updated, and both the writing and reading of data are executed for each two or more system areas. Thus, the access time will increase.

In this respect, Japanese Laid-open Patent Publication No. 2006-309866 discloses technique in which identification data that identifies the medium is read, and ON/OFF of the verify processing is automatically switched in accordance with the identification data. Japanese Laid-open Patent Publication No. 2005-322287 discloses technique in which the access frequency to each two or more system areas is recorded, and when the system data is read, the system data recorded in the system area with the largest access frequency of two or more system areas is read. According to the technique disclosed in Japanese Laid-open Patent Publication No. 2006-309866, it is possible to omit the verify processing for the medium with high reliability of the data update. According to the technique disclosed in Japanese Laid-open Patent Publication No. 2005-322287, it is possible to save time that reads all of the two or more recorded system data on each of two or more system areas and compares those with one another, and is possible to acquire easily the latest system data of those two or more system data.

However, even if the above-mentioned technique is applied, it is impossible to cope with both the reduction of the processing time to the access to the system area and the improvement of reliability enough. Especially, there is a problem that electronic equipment cannot be started when failing in reading the system data to all system areas.

This problem doesn't limit to the magnetic disk unit that executes the information access for the magnetic disk, and be a problem of generally applying to the data memory that executes the information access in the recording medium where the system data was recorded in the multiple.

SUMMARY

According to an aspect of the invention, a data storage device includes:

a recording medium that has two or more system data recording areas on which system data are recorded on a multiple basis, and a user data recording area on which user data is recorded;

a head that performs data writing into the recording medium and data reading from the recording medium; and a system data update control section that causes the head to perform update of the system data on the recording medium, wherein the system data update control section causes the head to record new system data on a multiple basis in another sub-record area that is alternately selected at each update to the new system data over the two or more system data recording areas when each the two or more system data recording areas is divided into two sub-record areas, and read the new system data from the another sub-record area to confirm that the new system data is recorded correctly.

According to another aspect of the invention, a data storage device includes:

a recording medium that has two or more system data recording areas on which system data are recorded on a multiple basis, and a user data recording area on which user data is recorded;

a head that performs data writing into the recording medium and data reading from the recording medium;

a buffer that temporarily preserves system data read with the head, the buffer having two or more division areas;

a deletion section that deletes the system data recorded on the buffer; and a system data read control section that causes the head to perform reading of the system data recorded on the two or more system data recording areas, wherein when the system data read control section causes the head to read sequentially system data recorded on the two or more system data recording areas, and preserves sequentially the system data in the buffer, latest system data is obtained by repetition of a process in which at stage that two system data older read is preserved in the buffer, old and new of the two system data are compared with one another, and the system data since the third is overwritten on the older system data on the buffer and old and new of two system data on the buffer is compared with one another, and the deletion section deletes data preserved in the buffer after the system data read control section obtains the latest system data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6A through FIG. 6D are each an example of system management information;

DESCRIPTION OF EMBODIMENTS

Embodiments of the present invention will be described with reference to the accompanying drawings.

Figure 1A:
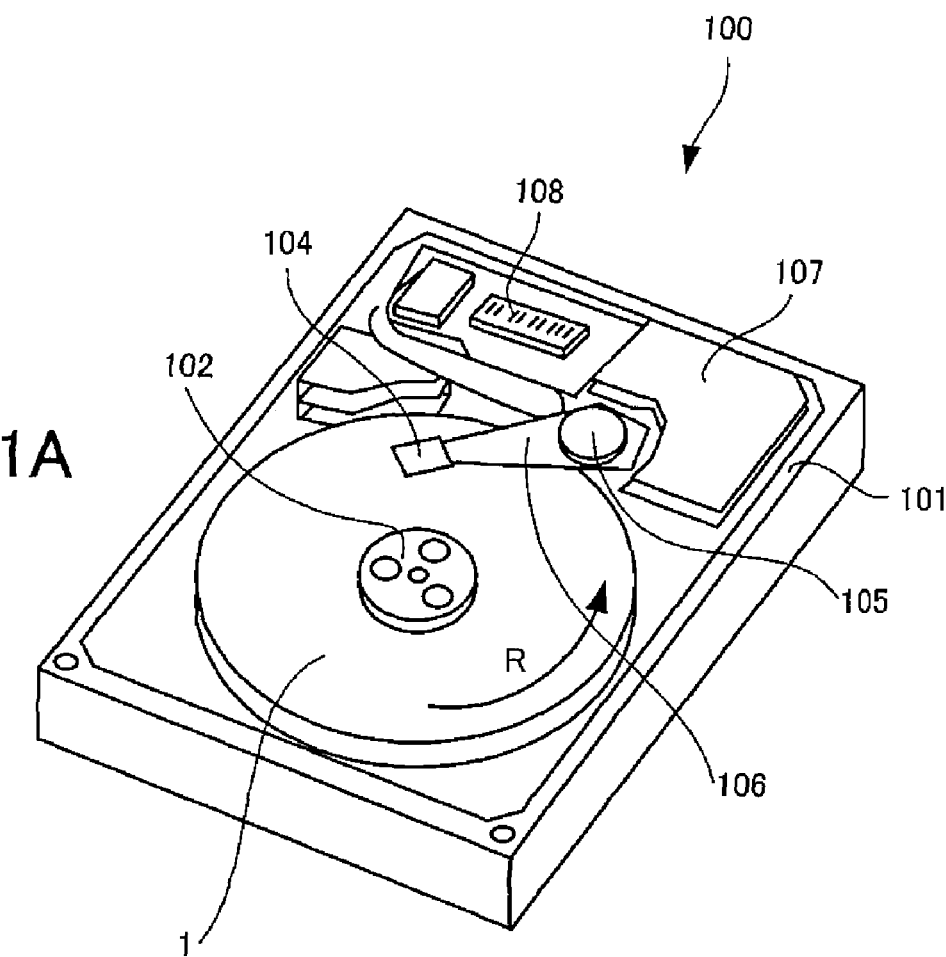
FIG. 1A and FIG. 1B are each a perspective view of a hard disk unit.
Figure 1B:
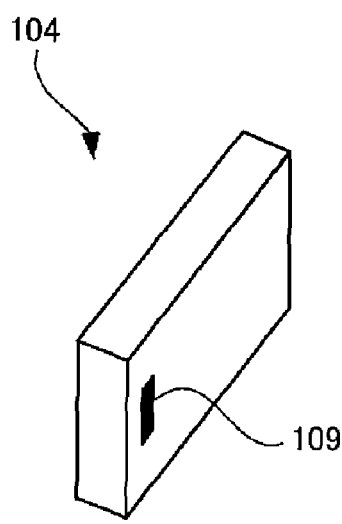

FIG. 1A and FIG. 1B are each a perspective view of a hard disk unit 100.

The hard disk unit 100 is connected with a host device, for example, a personal computer and the like, or is built internally and used.

As illustrated in FIG. 1A, a housing 101 of the hard disk unit 100 accommodates: a magnetic disk 1 where information is recorded; a spindle motor 102 that rotates the magnetic disk 1 in direction of arrow R; a flying head slider 104 that approaches a surface of the magnetic disk 1 and is opposed; an arm axis 105; a carriage arm 106 in which the flying head slider 104 is fixed on a tip of the carriage arm 106, the carriage arm 106 moving on the magnetic disk 1 around the arm axis 105; a voice coil motor 107 that drives the carriage arm 106; and a control circuit 108 that controls operation of the hard disk unit 100. The magnetic disk 1 corresponds to one example of the recording medium in a basic form of the data storage medium mentioned above.

As illustrated in FIG. 1B, a magnetic head 109 which applies a magnetic field to the magnetic disk 1 is installed on the tip side of the surface opposed to the magnetic disk 1 of the flying head slider 104. The hard disk unit 100 records information on the magnetic disk 1 by using the magnetic field, and reads information recorded on magnetic disk 1. The magnetic head 109 corresponds to one example of the head in a basic form of the data storage medium mentioned above.

Figure 2:
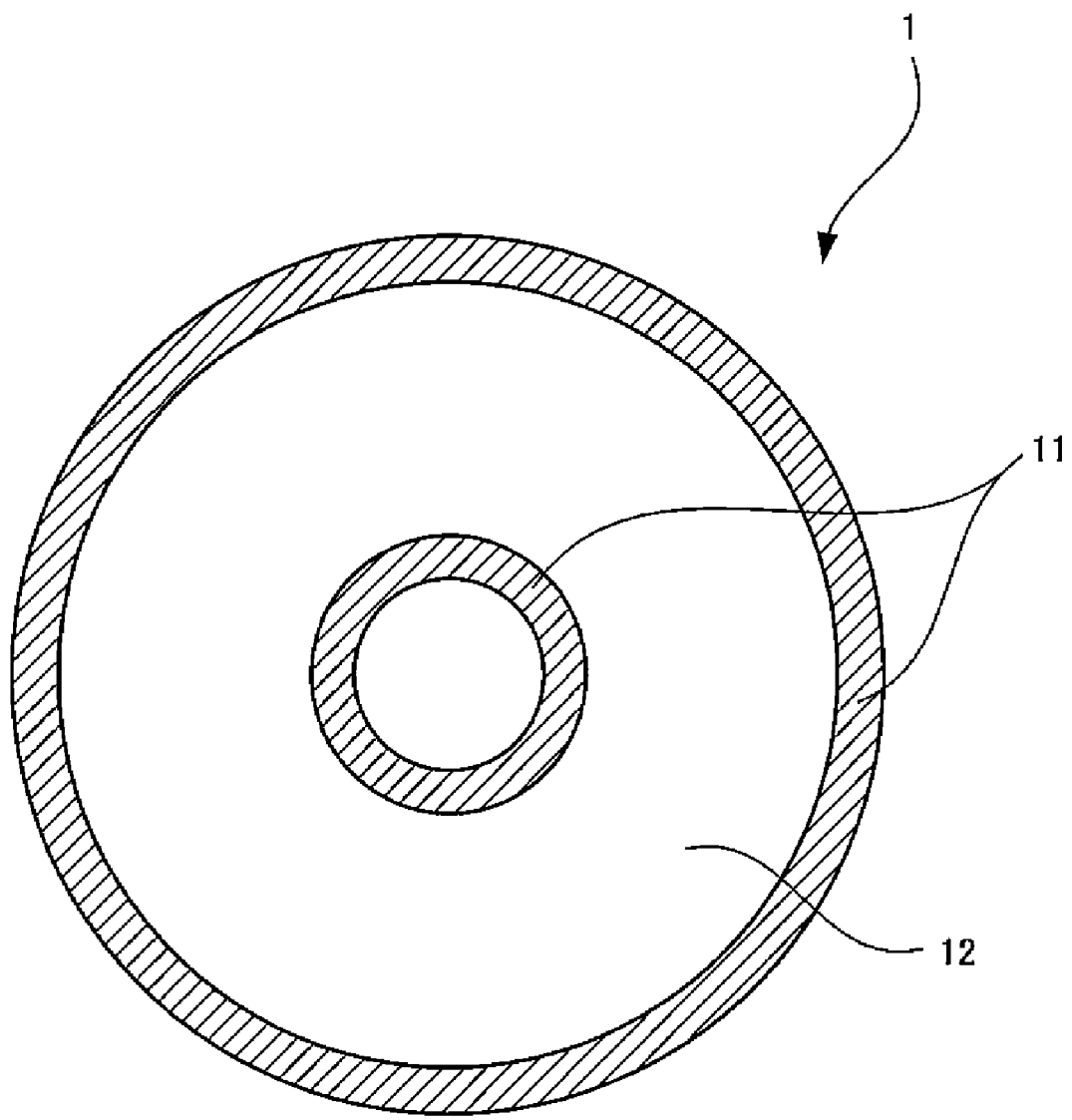
FIG. 2 is a conceptual view of a magnetic disk.

FIG. 2 is a conceptual view of a magnetic disk 1.

In the magnetic disk 1, system area 11 where the system data necessary for the information access is recorded is prepared in an inner part and the outer part in addition to a user area 12 where the user data that is the access object is recorded. This system data is composed of a serial number of the hard disk unit, an address of a defect area of the user area 12, a password for security, and an error log. The user area 12 corresponds to one example of the user data recording area in a basic form of the data storage device mentioned above.

Figure 3:
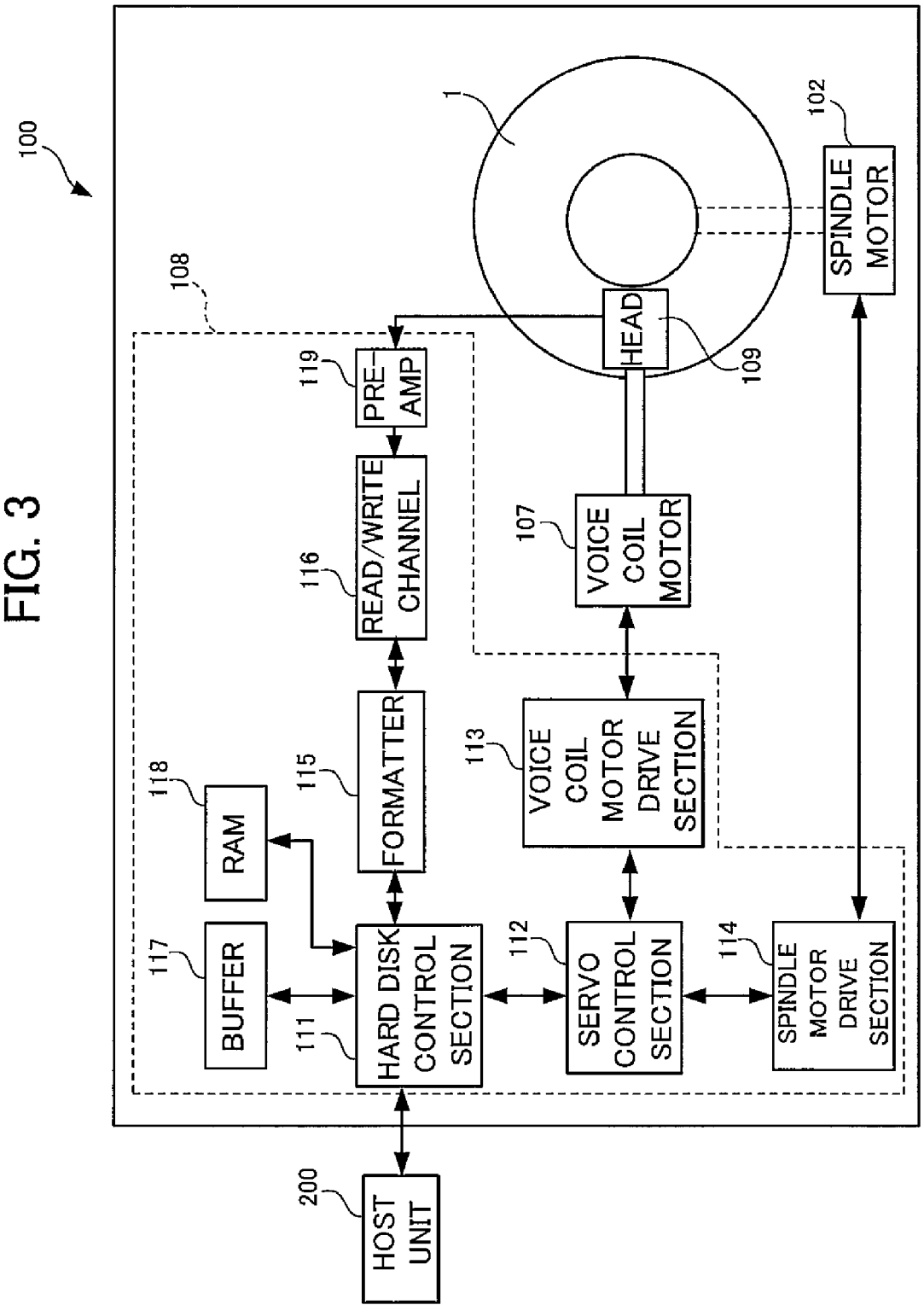
FIG. 3 is a functional block diagram of a hard disk unit.

FIG. 3 is a functional block diagram of a hard disk unit 100.

As illustrated in FIG. 3, the hard disk unit 100 is provided with the spindle motor 102, the voice coil motor 107, the control circuit 108, and the magnetic head 109, which are illustrated in FIG. 1. The control circuit 108 is composed of: a hard disk control section 111 that performs a control of the hard disk unit 100 in its entirety; a servo control section 112 that controls the spindle motor 102 and the voice coil motor 107; a voice coil motor drive section 113 that drives the voice coil motor 107; a spindle motor drive section 114 that drives the spindle motor 102; a formatter 115 that formats the magnetic disk 1; a read/write channel 116 that performs generation of the writing current carrying writing information into the magnetic disk 1, and performs conversion of the reproduction signal that is obtained through reading by the magnetic head 109 information recorded on the magnetic disk 1 into digital data; a buffer 117 used as cache in the hard disk control section 111; a RAM 118 used as work area in the hard disk control section 111; and a preamp 119 that amplifies reproduction signal read by the magnetic head 109. The hard disk control section 111 corresponds to one example of the system data update control section in a basic form of the data storage device mentioned above.

When information is written in the magnetic disk 1, writing information to be recorded on the magnetic disk 1 and writing position address are transmitted from a host unit 200 illustrated in FIG. 3 to the hard disk unit 100. The hard disk control section 111 transfers the transmitted address to the servo control section 112.

The servo control section 112 instructs the spindle motor drive section 114 to rotate the spindle motor 102, and instructs the voice coil motor drive section 113 to move the carriage arm 106 (Refer to FIG. 1). The spindle motor drive section 114 drives the spindle motor 102 and rotates the magnetic disk 1, and the voice coil motor drive section 113 drives the voice coil motor 107 and moves the carriage arm 106. As a result, the magnetic head 109 is positioned on the magnetic disk 1.

When the magnetic head 109 is positioned, the hard disk control section 111 transmits the writing signal to the read/write channel 116. The read/write channel 116 applies the current carrying the writing information to the magnetic head 109.

On the magnetic head 109, the magnetic flux corresponding to the writing signal is transmitted to the magnetic disk 1, so that the magnetization of the direction according to the information is formed to the magnetic disk 1, and the information is recorded.

Moreover, when information recorded on the magnetic disk 1 is read, the address of the record position in which information is recorded is sent from the host unit 200 illustrated in FIG. 3 to the hard disk unit 100. Sequentially, the spindle motor 102 is driven in rotation to rotate the magnetic disk 1, and the voice coil motor 107 drives to move the carriage arm 106, so that the magnetic head 109 is positioned on the magnetic disk 1.

On the magnetic head 109, a reproduction signal corresponding to the magnetization of the magnetic disk 1 is generated. After the reproduction signal is converted into the digital data with the read/write channel 116 illustrated in FIG. 3, the reproduction signal is sent to the host unit 200 through the hard disk control section 111.

Basically, the information access to the magnetic disk 1 is performed in the manner as mentioned above.

According to the present embodiment, the system data is recorded on the system area 11 of FIG. 2 on a multiplexing basis. In the following, it explains the method of updating the multiplexed system data in detail.

Figure 4:
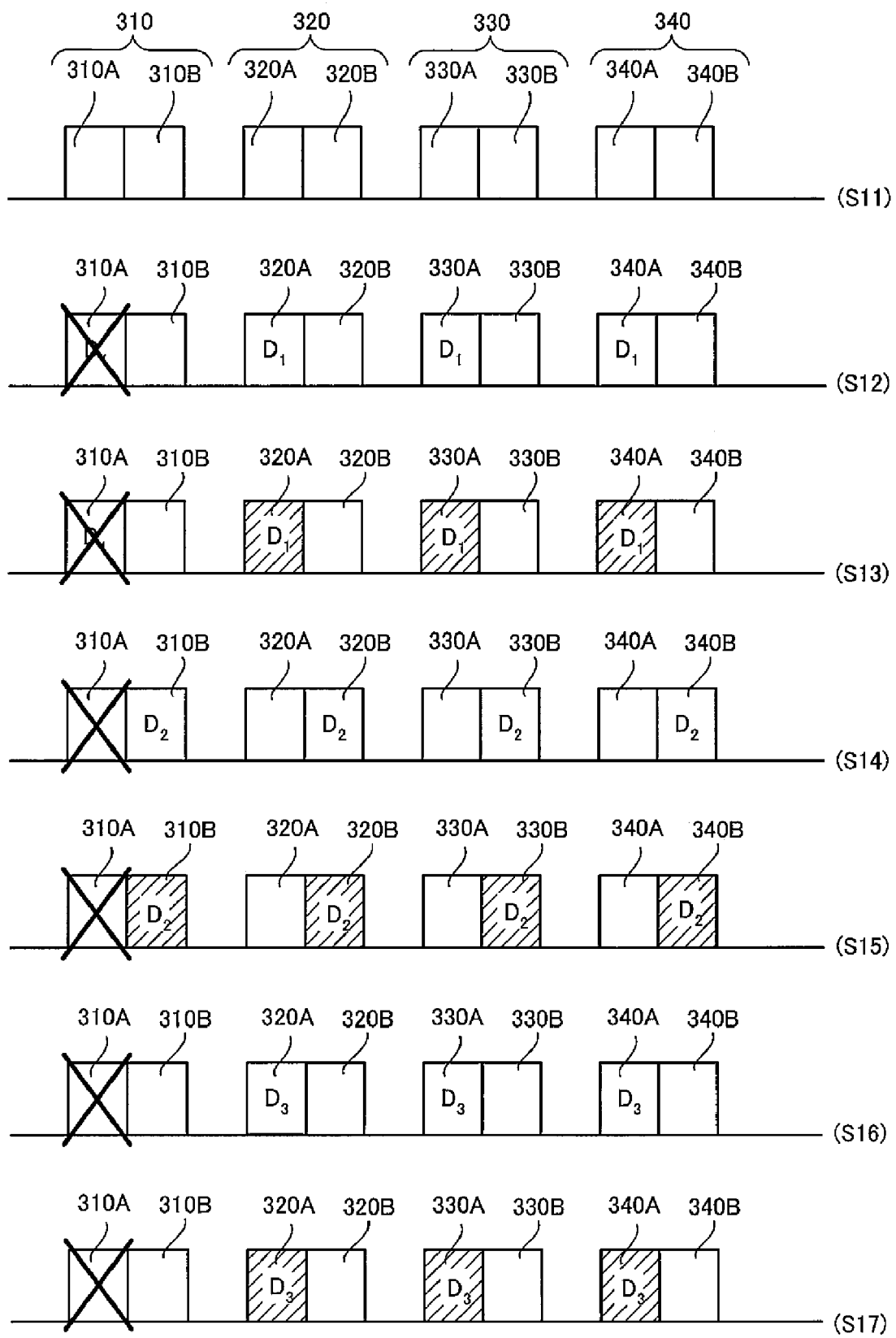
FIG. 4 is a conceptual view of system data recorded on the system area.
Figure 5:
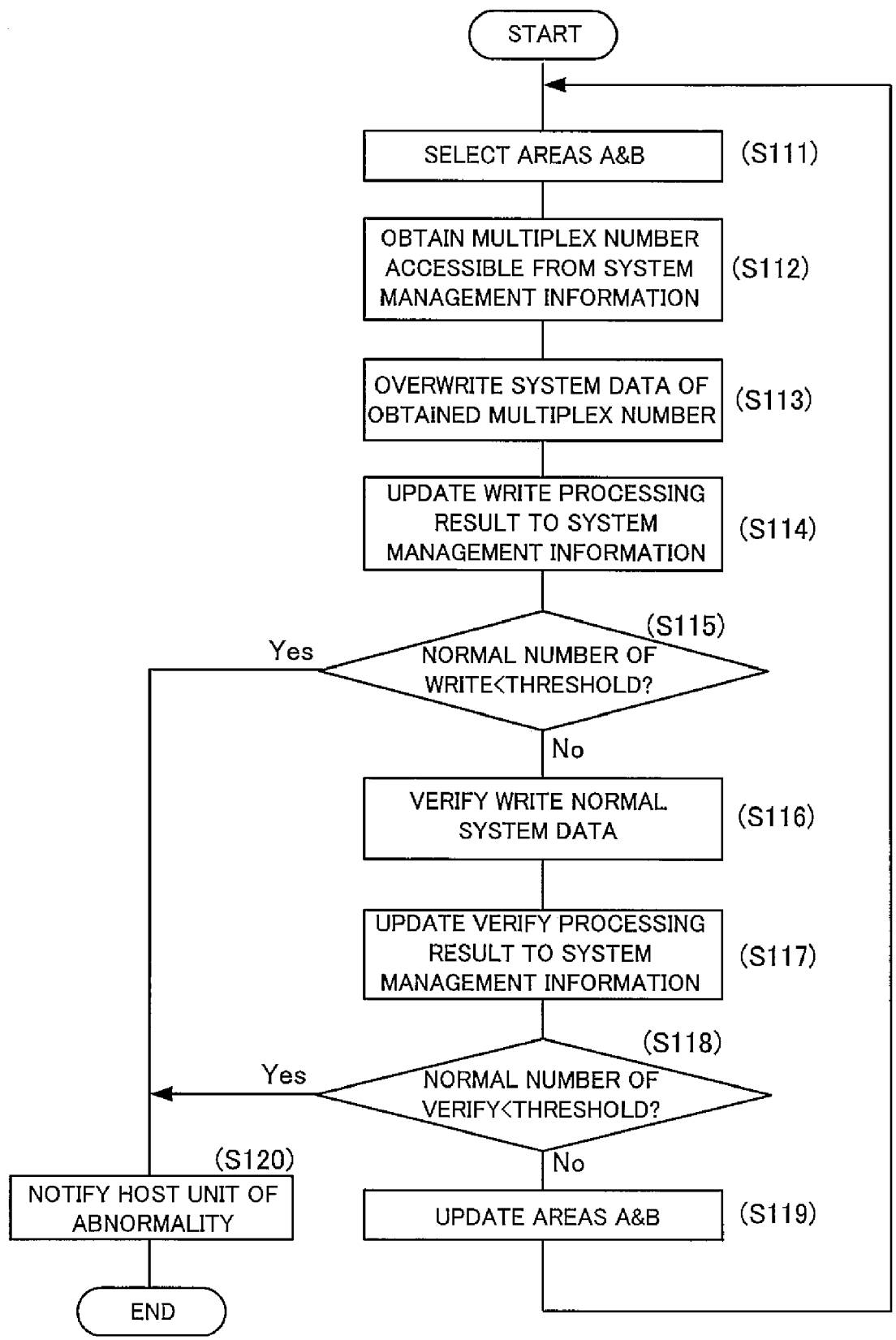
FIG. 5 is a flowchart useful for understanding a series of processing to renew system data that is subjected to multiplexing.

FIG. 4 is a conceptual view of system data recorded on the system area. FIG. 5 is a flowchart useful for understanding a series of processing to renew system data that is subjected to multiplexing.

As illustrated in step S11 in FIG. 4, two or more multiplex areas 310, 320, 330, and 340 (four pieces in FIG. 4) are prepared for in the system area 11 illustrated in FIG. 2, and in addition, the multiplex areas 310, 320, 330, and 340 are each divided into two sub-areas. In the following, of the two sub-areas, the sub-area at the left of FIG. 4 is denoted through appending "A" to the end of the sign of individual multiplex areas 310, 320, 330, and 340, and the sub-area at the right of FIG. 4 is denoted through appending "B" to the end of the sign of individual multiplex areas 310, 320, 330, and 340. The multiplex areas 310, 320, 330, and 340 correspond to one example of two or more system data recording areas in a basic form of the data storage device mentioned above, and the sub-area where individual multiplex areas 310, 320, 330, and 340 is divided corresponds to one example of the sub-record area in the basic form of the data storage device mentioned above.

First of all, when the system data is updated, the hard disk control section 111 illustrated in FIG. 3 selects one of the two sub-areas constituting individual multiplex areas 310, 320, 330, and 340 (step S111 in FIG. 5). Since it is now the initial state, first of all, the sub-areas 310A 320A, 330A, and 340A of the left side are selected.

Moreover, in the RAM 118 illustrated in FIG. 3 preserves system management information that indicates whether writing (write) of the system data into two sub-areas that constitute individual multiplex areas 310, 320, 330, and 340 and confirmation (verify) of the read system data succeed.

FIG. 6A, FIG. 6B, FIG. 6C, and FIG. 6D are each an example of system management information.

As seen from FIG. 6A, FIG. 6B, FIG. 6C, and FIG. 6D, the system management information is composed of the write result of the system data (success "01" and failure "00") to each two sub-areas that constitute individual multiplex areas 310, 320, 330, and 340, the verify result in which the written system data are read, and it is confirmed whether the read data is correct (success "01" and failure "00"), the total value of the write result, and the total value of the verify result. The total value of the write result indicates the number of sub-areas that succeed in writing of the system data among all the sub-areas. The total value of the verify result indicates the number of sub-areas wherein correct data is obtained by reading the written system data. As seen from FIG. 6A, in the initial state, all the write results and the verify results are set to success "01", and a normal value of the write result and the verify result is set to all the numbers of sub-areas ("8" in this example).

In the hard disk control section 111, system management information recorded in RAM 118 is acquired, and the sub-area where the write result is success "01" is retrieved among the sub-areas 310A, 320A, 330A, and 340A selected, of the multiplex areas 310, 320, 330, and 340 respectively (step S112 in FIG. 5). As seen from FIG. 6A, in the initial state, all the write results are set to success "01", and thus at this point, all the sub-areas 310A, 320A, 330A, and 340A selected are retrieved.

Subsequently, the hard disk control section 111 transmits to the magnetic head 109 a writing instruction in which the new system data is written to the individual retrieved sub-areas 310A, 320A, 330A, and 340A. On the magnetic head 109, as seen from step S12 in FIG. 4, new system data "D1" is overwritten into the sub-areas 310A, 320A, 330A, and 340A (step S113 in FIG. 5).

When writing of the system data completes, the hard disk control section 111 acquires the writing result in the individual sub-areas 310A, 320A, 330A, and 340A, and the system management information is updated based on the acquired writing result (step S114 in FIG. 5). In step S12 in FIG. 4, writing of the sub-area 310A that composes the multiplex area 310 fails, and as seen from FIG. 6B, the write result of the sub-area 310A of the system management information is changed to failure "00", and normal number of write results is decreased by one, so that it is changed to "07".

Subsequently, a normal number of write results in the system management information is compared with a predetermined threshold (in the present embodiment, it is assumed "04"). According to the present example, because the normal number "07" of write results is larger than threshold "04" (step S115: No in FIG. 5), the hard disk control section 111A transmits to the magnetic head 109 the instruction to execute the verify processing for the sub-areas 320A, 330A, and 340A whose write result is success "01". As a result, the magnetic head 109 reads the system data recorded on the sub-areas 320A, 330A, and 340A, and the hard disk control section 111 temporarily preserves system data in the sub-areas 320A, 330A, and 340A read in the buffer 117, and thereafter, it is confirmed whether the each system data is correct (step S116 in FIG. 5). According to the present example, it explains assuming that it is confirmed that the verify processing is executed for the sub-areas 320A, 330A, and 340A, and the correct system data is written in the individual sub-areas 320A, 330A, and 340A, as indicated in step S13 in FIG. 4.

Here, it is preferable, in the data storage device of the first aspect described in SUMMARY, that The data storage device according to claim 1, wherein the data storage device further includes: an access result preservation section that preserves an access result of an indication of failure when failing in update of the system data about each the two or more system data recording areas, and the system data update control section causes the head to execute the update of the new system data regarding a system data recording area excepting a system data recording area which preserves an access result of indicating the failure in the update of the system data in the access result preservation section, of the two or more system data recording areas.

It is also preferable, in the data storage device of the first aspect described in SUMMARY, that the access result preservation section performs record and read of the system data on each the two or more system data recording areas, and preserves the access result, and the system data update control section causes the head to record new system data on a system data recording area excepting a system data recording area which preserves an access result of indicating the failure in the record and read of the system data in the access result preservation section, of the two or more system data recording areas, and read the new system data from a system data recording area which succeeds in recording of the new system data to confirm that the new system data is recorded correctly.

The read of the system data is executed only for the system data recording area where the record or reading the system data succeeds, so that the access to the system data recording area where the error occurs can be omitted, and the processing time can be shortened. RAM 118 corresponds to one example of the access result preservation section in applied form of the data storage device mentioned above.

When verify processing ends, system management information is updated in accordance with the verify result. In this example, as seen from FIG. 6C, of the system management information, the verify result of the sub-areas 320A, 330A, and 340A is maintained success "01", the verify result of the sub-area 310A is changed to failure "00", and a normal number of verify results is changed to "07" (step S117 in FIG. 5).

Subsequently, a normal number of verify results in the system management information is compared with a predetermined threshold (in the present embodiment, it is assumed "04"). According to the present example, because the normal number "07" of write results is larger than threshold "04" (step S118: No in FIG. 5), the sub-area where the update of the system data is executed is switched from the sub-areas 310A, 320A, 330A, and 340A that are now selected, of the left side to the other right sub-areas 310B, 320B, 330B, and 340B, of two sub-areas which compose the multiplex areas 310, 320, 330, and 340 (step S119 in FIG. 5).

The update of the system data is executed in the manner as mentioned above.

In addition, when the user changes the password for security, the new system data including the password after change is recorded in the right sub-areas 310B, 320B, 330B, and 340B.

First of all, in the hard disk control section 111, switched right sub-areas 310B, 320B, 330B, and 340B are selected (step S111 in FIG. 5), and the system management information recorded in RAM 118 is acquired, and the sub-area where the write result is success "01" is retrieved from among the selected sub-areas 310B, 320B, 330B, and 340B (step S112 in FIG. 5).

Subsequently, the hard disk control section 111 transmits to the magnetic head 109 a writing instruction to write new system data into the retrieved individual sub-areas 310B, 320B, 330B, and of 340B, so that the magnetic head 109 overwrite the new system data "D2" into sub-areas 310B, 320B, 330B, and 340B as depicted in step S14 in FIG. 4 (step S113 in FIG. 5).

In the hard disk control section 111, system management information is updated based on the writing result in the individual sub-areas 310B, 320B, 330B, and 340B (step S114 in FIG. 5). In step S14 in FIG. 4, the writing processing of individual sub-areas 310B, 320B, 330B, and 340B succeeds, and as seen from FIG. 6C, write results of the sub-areas 310B, 320B, 330B, and 340B of the system management information and a normal number of the write results are maintained without being changed.

A normal number of write results in the system management information is compared with the threshold. When the normal number of write results is larger than the threshold (step S115 "No" in FIG. 5), as seen from step S15 in FIG. 4, the magnetic head 109 reads the new system data written into sub-areas 310B, 320B, 330B, and 340B, and the hard disk control section 111 confirms whether the read system data is correct (step S116 in FIG. 5).

When verify processing ends, the verify result in the system management information indicated in Table 1 is updated (step S117 in FIG. 5). When a normal number of verify results is larger than the threshold (step S118 "No" in FIG. 5), the sub-areas wherein the update of the system data is executed is switched from sub-areas 310B, 320B, 330B, and 340B of right that are now selected, to the sub-areas 310A, 320A, 330A, and 340A of left (step S119 in FIG. 5).

In addition, when the new system data is generated, the hard disk control section 111 selects the sub-areas 310A, 320A, 330A, and 340A switched of the left side (step S111 in FIG. 5), and the sub-area where the write result in the system management information is success "01" is retrieved from among the sub-areas 310A, 320A, 330A, and 340A selected (step S112 in FIG. 5). As seen from FIG. 6C, because the sub-area 310A of the left end of the selected sub-areas 310A, 320A, 330A, and 340A fail in the first write processing, three sub-areas 320A, 330A, and 340A, excluding the sub-area 310A of the left end are retrieved.

The retrieval result is transferred to the magnetic head 109. As seen from step S16 in FIG. 4, the magnetic head 109 overwrites the new system data "D3" in three sub-area 320A, 330A, and 340A where the write result in system management information is success "01" (step S113 in FIG. 5), and the hard disk control section 111 updates the system management information (step S114 in FIG. 5).

When a normal number of write results in the system management information is larger than the threshold (step S115 "No" in FIG. 5), the magnetic head 109 reads the new system data written into the sub-areas 320A, 330A, and 340A wherein the write processing succeeds, and the hard disk control section 111 performs confirmation of the read system data (step S116 in FIG. 5), and update of the verify result in the system management information (step S117 in FIG. 5).

As mentioned above, according to the hard disk unit 100 of the present embodiment, the other sub-area is alternately selected from among two sub-areas which constitute the multiplex areas 310, 320, 330, and 340, and writing and the verify of the system data are executed for the selected sub-area. Therefore, the old last system data is recorded on a multiple basis in the sub-area that is not selected, though the new system data is recorded in the selected sub-area on a multiple basis.

When the power supply for personal computers equipped with the hard disk unit 100 is turned on, the magnetic head 109 reads the system data recorded in the multiplex areas 310, 320, 330, and 340 in accordance with the instruction from the hard disk control section 111, and the read system data is preserved in the buffer 117. In the hard disk unit 100, the latest system data is selected from among two or more system data preserved in buffer 117, and the start of the hard disk unit 100 is begun by using the latest system data thus selected. At that time, even if failing in reading the system data recorded in the sub-record area of the selected one, the hard disk unit 100 can be started up by using the old system data recorded in the other sub-record area and the reliability of the entire device can be improved. Moreover, writing and verify of the latest system data for only one of two sub-areas are executed, and those processing for the other sub-record area is omitted. This feature makes it possible to reduce an increase in the processing time.

In step S115 or step S118 in FIG. 5, as seen from FIG. 6D, when a normal value of write result in the system management information and a normal value of the verify result become smaller than the threshold (step S115: Yes and step S118: Yes in FIG. 5), the hard disk control section 111 transmits to the host unit 200 the message to notify abnormality (step S120 in FIG. 5).

Here, in the data storage medium according to the first aspect described in SUMMARY, it is preferable that the data storage device is connected with an external device, and the data storage device further includes: a success number computing section that computes number of the system data recording areas that succeed in update among the two or more system data recording areas, and a notification section that notifies the external device of breakdown of the data storage device when number of system data recording areas computed in the success number computing section is smaller than that of a prescribed threshold.

In the event that the number of accessible system data recording areas remains and it is a little, when the access to the remaining system data recording area fails, the data storage device might not be able to be started up. Trouble that the data storage device doesn't start at all can be prevented beforehand by the error message being notified to an external device when the system data recording area where the access of two or more system data recording areas succeeds is smaller than a prescribed threshold.

Hard disk control section 111 corresponds to one example of the success number computing section in the application form of the data storage device mentioned above, and also corresponds to one example of the notification section in the application form of the data storage device mentioned above.

Thus, according to the hard disk unit 100 of the present embodiment, two or more multiplex areas 310, 320, 330, and 340 respectively are divided into two sub-areas further, one side of those two sub-areas is selected alternately, and writing and verify of the system data are performed. Therefore, a multiple number can be increased by suppressing the processing time taking to update the system data. Further, the hard disk unit 100 can be started up by using the old system data recorded in the sub-area (for instance, the sub-areas 310B, 320B, 330B, and 340B) in no selection even if failing in reading all of the selected sub-areas (the sub-areas 310A, 320A, 330A, and 340A for instance), and the reliability of the device can be improved.

The explanation of the first embodiment of the data storage device mentioned above is ended, and it explains the second embodiment of the data storage device mentioned above. The second embodiment has the same structure as the first embodiment, but the second embodiment is different from the first embodiment in the processing at the time when the system data is updated. Therefore, FIG. 3 is used also for the explanation of the second embodiment, and it explains only the difference point from the first embodiment.

Figure 7:
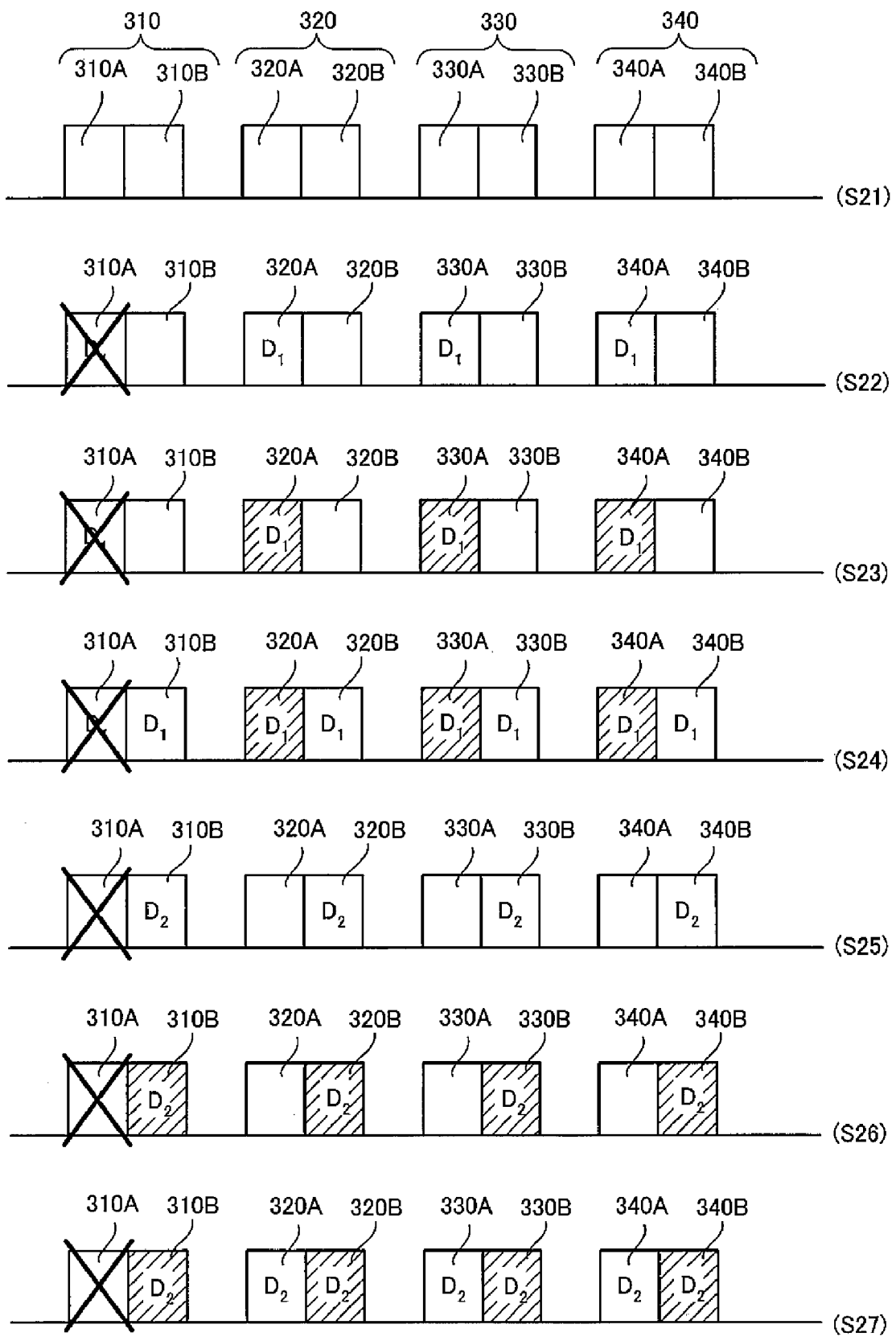
FIG. 7 is a conceptual view of system data recorded on the system area in a hard disk unit of a second embodiment.
Figure 8:
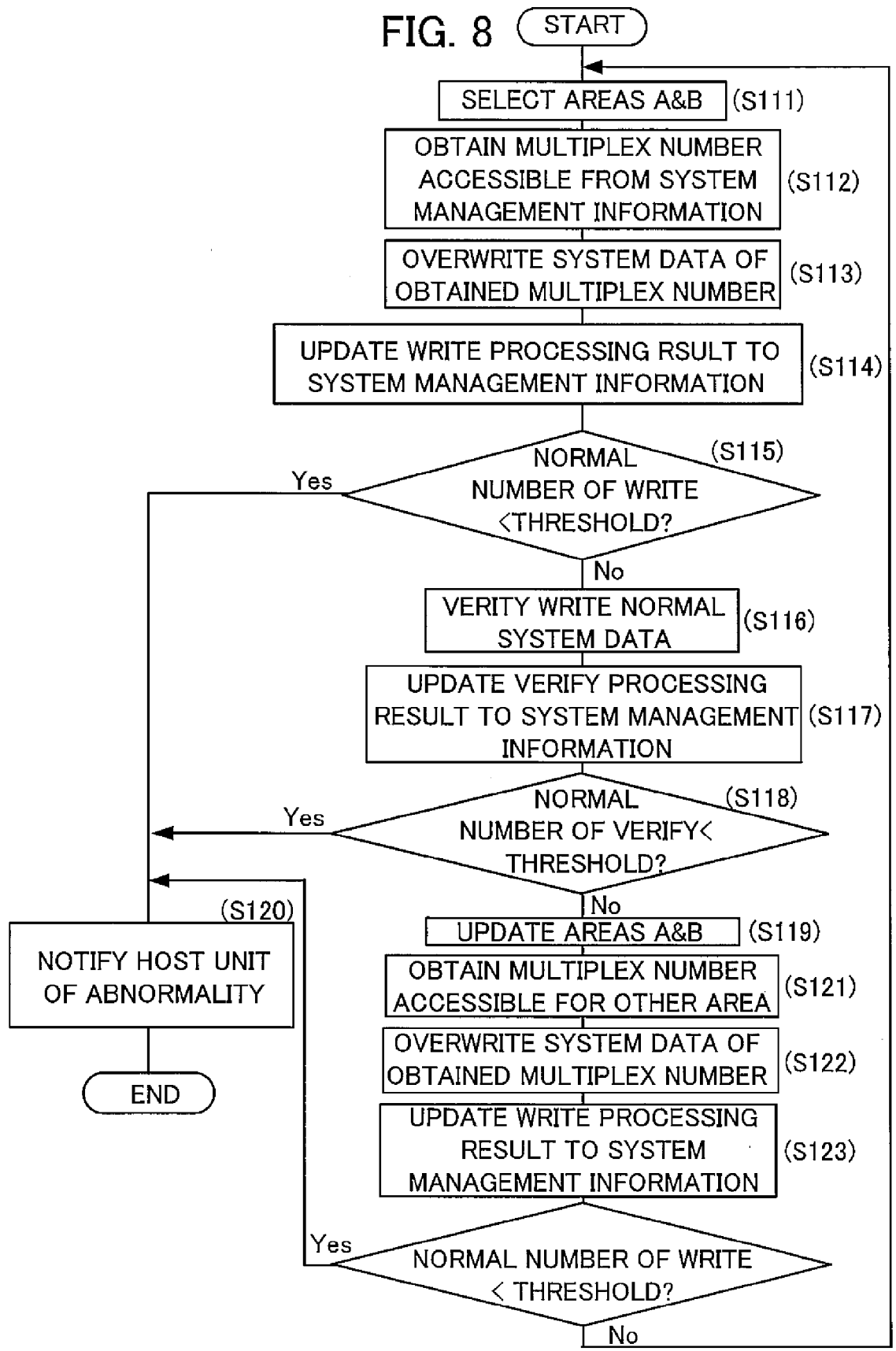
FIG. 8 is a flowchart useful for understanding a series of processing to renew system data that is subjected to multiplexing in the hard disk unit of the second embodiment.

FIG. 7 is a conceptual view of system data recorded on the system area in a hard disk unit of a second embodiment. FIG. 8 is a flowchart useful for understanding a series of processing to renew system data that is subjected to multiplexing in the hard disk unit of the second embodiment.

In the present embodiment too, it explains assuming that each two or more multiplex areas 310, 320, 330, and 340 (four in FIG. 7) is divided into two sub-areas, as illustrated in step S21 in FIG. 7.

When the system data is updated, in a similar fashion to the first embodiment explained in conjunction with FIG. 5, in the hard disk control section 111 illustrated in FIG. 3, the other sub-area is selected from among two sub-areas where multiplex areas 310, 320, 330, and 340 are composed (step S111 in FIG. 7), and the system management information recorded in RAM 118 is acquired to retrieve sub-area where the write result is success "01", of the selected sub-areas (step S112 in FIG. 8). In the initial state, the sub-areas 310A, 320A, 330A, and 340A of the left side are selected, and all of the selected sub-areas 310A, 320A, 330A, and 340A are retrieved.

Subsequently, as indicated in step S22 in FIG. 7, in the magnetic head 109, new system data "D1" is overwritten in the sub-areas 310A, 320A, 330A, and 340A (step S113 in FIG. 8), and in the hard disk control section 111, system management information is updated based on the writing result in the sub-areas 310A, 320A, 330A, and 340A (step S114 in FIG. 8). In step S22 in FIG. 7, the sub-area 310A of the left end fails in writing, and the write result of the sub-area 310A in system management information is changed to failure "00", and a normal number of write results is decreased by one.

In a case where a normal number of write results in system management information is larger than the threshold (step S115 "No" in FIG. 8), the magnetic head 109 reads the system data recorded in the sub-area 320A, 330A, and 340A wherein write result is success "01", and the hard disk control section 111 confirms whether individual system data thus read of the sub-area 320A, 330A, and 340A is correct (step S116 in FIG. 8).

When verify processing ends, system management information is updated based on the verify result (step S117 in FIG. 8). In a case where the normal number of verify results in system management information is larger than the threshold (step S118 "No" in FIG. 8), the sub-area where the update of the system data is executed is switched from the sub-areas 310A, 320A, 330A, and 340A of the left side which are now selected to the other right sub-areas 310B, 320B, 330B, and 340B (step S119 in FIG. 8).

Moreover, according to the present embodiment, the sub-area where the write result in system management information is success "01" is retrieved among write sub-area 310B, 320B, 330B, and 340B where the old system data remains (step S121 in FIG. 8), and the new system data is written also in the retrieved sub-area (step S122 in FIG. 8). According to this example, as illustrated in step S24 in FIG. 6, new same system data "D1" as the one recorded in the sub-areas 310A, 320A, 330A, and 340A of the left side is written in right sub-areas 310B, 320B, 330B, and 340B.

When writing of the system data ends, system management information is updated in accordance with the writing result (step S123 in FIG. 8).

When the new system data is written in the sub-areas 310A, 320A, 330A, and 340A of the left side in the beginning, the system data written in the sub-areas 310A, 320A, 330A, and 340A is read and the verify processing is executed. However, verify processing is not performed for right sub-areas 310B, 320B, 330B, and 340B though the new system data is written.

Here, when the user changes the password for security, the switched right sub-areas 310B, 320B, 330B, and 340B are selected (step S111 in FIG. 8), the sub-area where the write result is success "01" in system management information is retrieved (step S112 in FIG. 8) and new system data "D2"

including a new password and the like is overwritten in the sub-area retrieved, as indicated in step S25 in FIG. 7 (step S113 in FIG. 8).

The hard disk control section 111 updates system management information based on the writing result of the sub-areas 310B, 320B, 330B, and 340B each (step S114 in FIG. 8). When a normal number of write results in system management information is larger than the threshold (step S115 "No" in FIG. 8), new system data written in the sub-areas 310B, 320B, 330B, and 340B is read, as indicated in step S26 in FIG. 7, and it is confirmed whether the read system data is correct (step S116 in FIG. 8).

When verify processing ends, the verify result in system management information is updated (step S117 in FIG. 8). In a case where a normal number of verify results is larger than the threshold (step S118 "No" in FIG. 8), the sub-area to be updated is switched (step S119 in FIG. 8).

In addition, the sub-area where the write result in system management information is success "01" is retrieved among the left sub-areas 310A, 320A, 330A, and 340A where old system data "D1" remains (step S121 in FIG. 8), and the new system data is written in the retrieved sub-area too (step S122 in FIG. 8). According to this example, as seen from step S22, since it fails in writing of the system data into the sub-area 310A of the left end, new same system data "D2" as the one recorded in right sub-area 310B, 320B, 330B, and 340B is written in the sub-areas 320A, 330A, and 340A, except 310A of the left end.

According to the present embodiment, writing and verify of the latest system data are executed for only one of two sub-areas, and only writing of the system data is executed for the other of two sub-areas, and the verify processing is omitted for the other sub-record area. Because verify is not done for new system data that is recorded in other sub-record area different from the previously selected sub-record area, there is a possibility that reading error is generated. However, since the new system data is recorded in two or more multiplex areas 310, 320, 330, and 340 on a multiple basis, it is considered that one of them is able to be read. Thus, the new system data is recorded in individual two sub-areas and the other verify processing is omitted. This feature makes it possible to surely read the new system data suppressing the processing time.

The explanation of the second embodiment of the data storage device mentioned above is ended, and it explains the third embodiment of the data storage device mentioned above. With respect to the third embodiment too, it explains only the difference point from the first embodiment using FIG. 3.

Figure 9:
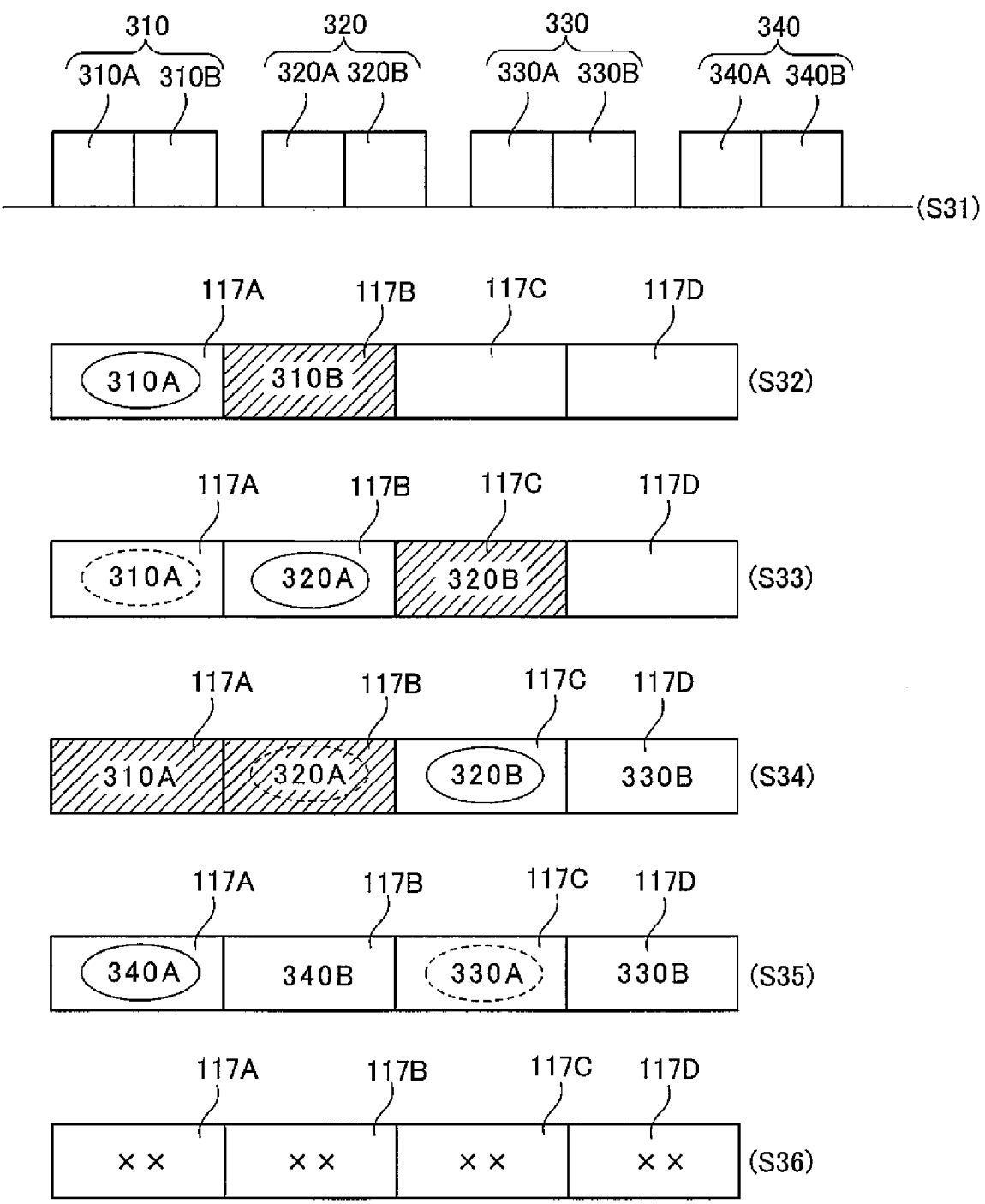
FIG. 9 is a conceptual view of system data which is temporarily stored in a buffer in a hard disk unit of a third embodiment.
Figure 10:
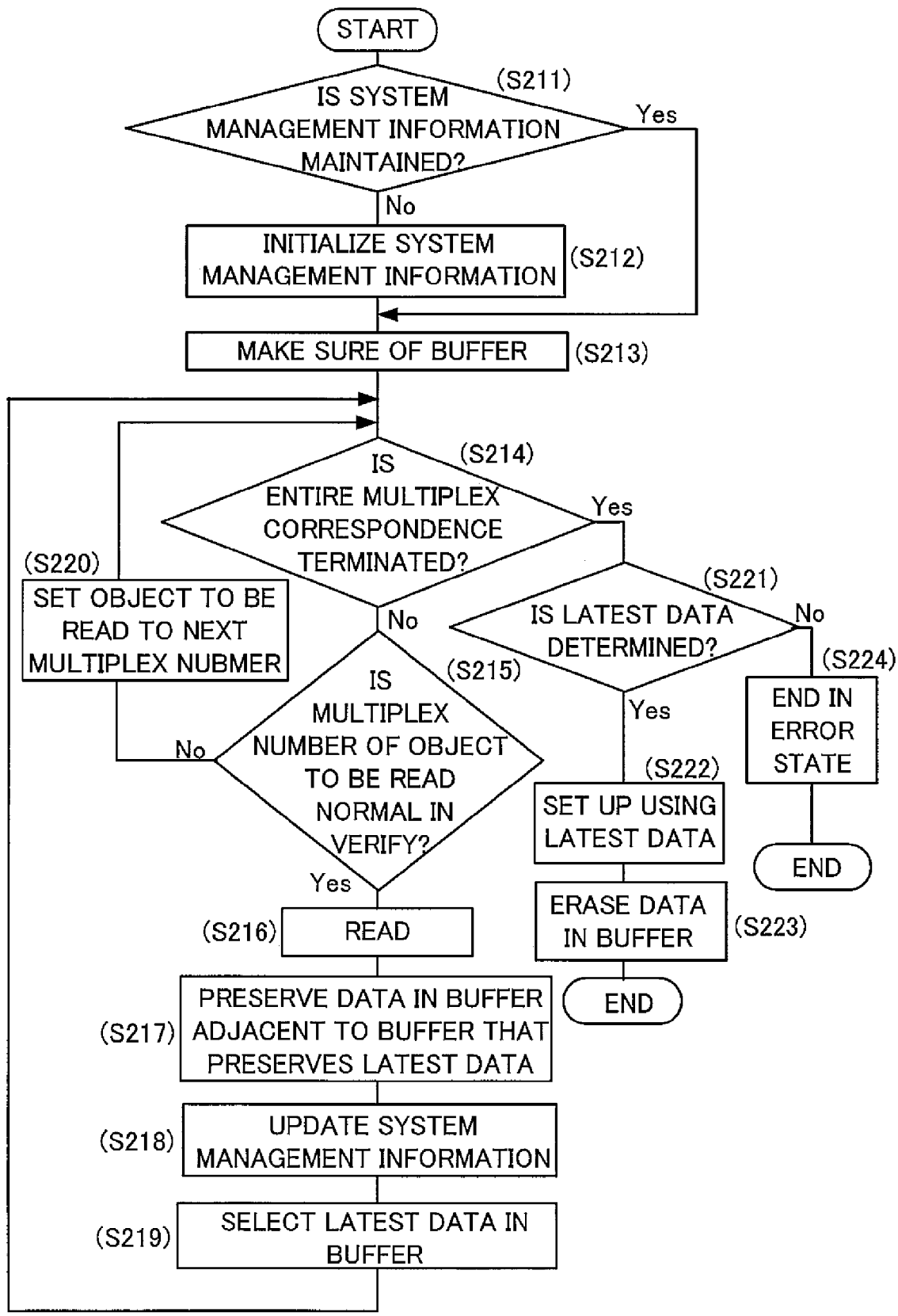
FIG. 10 is a flowchart useful for understanding a series of processing to read system data that is subjected to multiplexing in the hard disk unit of the third embodiment.

FIG. 9 is a conceptual view of system data which is temporarily stored in a buffer in a hard disk unit of a third embodiment. FIG. 10 is a flowchart useful for understanding a series of processing to read system data that is subjected to multiplexing in the hard disk unit of the third embodiment.

According to the present embodiment, as illustrated in step S31 in FIG. 9, each two or more multiplex areas 310, 320, 330, and 340 (four areas in FIG. 6) is divided into two sub-areas. Moreover, two or more division areas are prepared in the buffer 117 illustrated in FIG. 3, and when the system data is temporarily preserved, it explains assuming that four division areas 117A, 117B, 117C and 117D of those two or more division areas are used. The buffer 117 corresponds to one example of the buffer in the second basic form of the data storage device mentioned above, and the division areas 117A, 117B, 117C, and 117D correspond to one example of two or more division areas in the second basic form of the data storage device mentioned above.

For instance, when the password for security is acquired, the multiplexed system data is read, the latest system data is selected from among those two or more system data, and the access limitation and the like are performed by using the password in the latest system data.

When the system data is read, first of all, the hard disk control section 111 illustrated in FIG. 3 acquires system management information recorded in RAM 118. When the system management information is not recorded (step S211 in FIG. 10), system management information initialized as illustrated in FIG. 6A is generated (step S212 in FIG. 10), and it is preserved in RAM 118.

Subsequently, in the hard disk control section 111, there are secured the division areas 117A, 117B, 117C, and 117D of two or more division areas where buffer 117 is composed (step S213 in FIG. 10).

According to the present embodiment, two system data recorded in eight sub-areas where two or more multiplex areas 310, 320, 330, and 340 are composed are read, and the latest system data is selected. First of all, in system management information recorded in RAM 118, it is confirmed whether the write results of the first and second sub-areas 310A and 310B from the left illustrated in step S31 in FIG. 9 are success "01". When the write result is failure "00" (step S215: No in FIG. 10) in information of system management, the following sub-area in the sub-area is set as the reading object (step S220 in FIG. 10), and the write result of the set sub-area is confirmed.

When two sub-areas where the write result is both success "01" are retrieved (step S215: Yes in FIG. 10), the hard disk control section 111 transmits to the magnetic head 109 an instruction to read the system data recorded in those two sub-areas, so that the magnetic head 109 reads the system data recorded in the directed sub-area (step S216 in FIG. 10). According to this example, the write results of the first and second sub-areas 310A and 310B of the left are both success "01", and, as illustrated in step S32 in FIG. 9, the system data read from the sub-areas 310A and 310B is preserved in the division areas 117A and 117B of the buffer 117 (step S217 in FIG. 10). The hard disk control section 111 corresponds to one example of the system data reading control section of the second embodiment of the data storage device mentioned above.

In the hard disk control section 111, the verify result in the system management information is updated based on the reading result (step 218 in FIG. 10), and the latest system data of the secured division areas 117A, 117B, 117C, and 117D is selected (step S219 in FIG. 10). According to this example, the system data (system data of the sub-area 310A) preserved in the left division area 117A of two system data preserved in the division areas 117A and 117B is selected as the latest system data. In FIG. 9, the division area where the system data was newly preserved is illustrated in the slash, the latest system data is enclosed with the solid line, and the latest last system data is enclosed in the broken line.

When the latest system data is selected, the write result of the following two sub-areas that are adjacent to the right of the sub-area that is already read is acquired, and it is confirmed whether the write result of those sub-areas is success "01". According to this example, the write results of the third and fourth sub-areas 320A and 320B of the left illustrated in step S31 in FIG. 9 are acquired, and it is confirmed whether the write results of the sub-areas 320A and 320B are success "01" in system management information. When the write results of the sub-areas 320 and 320B are both success "01" (step S215: Yes in FIG. 10), the system data recorded in the sub-areas 320A and 320B is read (step S216 in FIG. 10). Two read system data are preserved in the division areas 117A and 117B and 117C that is adjacent to the right of the left division area 117A where the latest system data now is preserved, as illustrated in step S33 in FIG. 9 (step S217 in FIG. 10).

When the system data is preserved, the system management information is updated based on the reading result (step 218 in FIG. 10), and the latest system data of the division areas 117A, 117B, 117C, and 117D is selected (step S219 in FIG. 10). According to this example, the system data (system data of the sub-area 320A) preserved in the division area 117B second from the left is selected as the latest system data.

Similarly, the light results of the fifth and sixth sub-areas 330A and 330B from the left as illustrated in step S31 of FIG. 9 are acquired (step S215: Yes in FIG. 10), and the system data recorded in those sub-areas 330A and 330B is read (step S216 in FIG. 10). As illustrated in step S34 of FIG. 9, it is preserved in the division areas 117C and 117D that are adjacent to the right of the division area 117B second from the left where the latest system data now is preserved (step S217 in FIG. 10).

When the system management information is updated based on the reading result (step 218 in FIG. 10) the latest system data of the division areas 117A, 117B, 117C, and 117D is selected (step S219 in FIG. 10). According to this example, the system data (system data of the sub-area 330A) preserved in the division area 117C third from the left is selected as the latest system data.

Subsequently, the acquisition of the write result of the seventh and eighth sub-areas 340A and 340B from the left illustrated in step S31 in FIG. 9 is performed (step S215: Yes in FIG. 10), and the reading of the system data (step S216 in FIG. 10) is performed. As illustrated in step S35 in FIG. 9, because the latest system data now is preserved in the division area 117C third from the left, and there is no space that preserves two system data right, two read system data are preserved in the division areas 117A and 117B that are adjacent to the left of the division area 117C (step S217 in FIG. 10).

In addition, the system management information is updated (step 218 in FIG. 10), and the latest system data in the division areas, 117A, 117B, 117C, and 117D is selected (step S219 in FIG. 10). According to this example, the system data (system data of the sub-area 340A) preserved in the left division area 117C is selected as the latest system data.

The above-mentioned processing is executed for eight sub-areas where two or more multiplex areas 310, 320, 330, 340 are composed. When reading of the system data for all the sub-areas ends (step S214: Yes in FIG. 10), and the latest system data is not selected at that time (step S221: No in FIG. 10), the error message is displayed on the display screen of the host unit 200 and it ends (step S224 in FIG. 10).

When the latest system data is selected (step S221: Yes in FIG. 10), the selected latest system data is acquired (step S221: Yes in FIG. 10), and the access limitation and the setup processing of the machine are executed by using the acquired latest system data (step S222 in FIG. 10).

Moreover, when the latest system data is acquired, as illustrated in step S36 in FIG. 9, the hard disk control section 111 overwrites the dummy data on the secured division areas 117A, 117B, 117C, and 117D, of buffer 117, so that the system data that is preserved in the division area 117A, 117B, 117C, and 117D is deleted (step S223 in FIG. 10).

Here, in the second basic form of the data storage device mentioned above, it is preferable that the above-mentioned system data includes the password that permits the access of the data storage device.

When it tries to read the multiplexed system data recorded in the sub-area illustrated in step S31 in FIG. 9 at a time and to preserve it in the buffer 117, eight division areas are needed, and the deletion of the system data doesn't end until the power supply of an electronic equipment turns off even if the personal computer etc. shut down. Thus, the password that remains in the buffer might be acquired illegally by the third person. According to the present embodiment, since the division area where the system data is recorded is suppressed, the system data preserved in the buffer can be deleted high-speed and surely.

Here, it explained the example of applying the magnetic disk that records information by using the magnetic field as a recording medium in the above-mentioned explanation. However, the recording medium in the information access device mentioned above may be MO etc. that record information by using light.

Moreover, though it explained the example of temporarily preserving the system data by using four division areas of two or more division areas where the buffer is composed in the above-mentioned, the reason why it is to do so is that two system data recorded in the sub-area are read and processing is sped up. It is acceptable that the system data recorded in the sub-area are read one by one, and the read system data are preserved in two division areas alternately.

According to the first basic form of the data storage device described in the embodiment corresponding to the aspect firstly described in SUMMARY, each two or more system data recording areas is divided into two sub-recording areas further, and the system data is recorded in another sub-recording area that is selected alternately when the system data is updated, and in addition the recorded system data is read so that the presence of the error is confirmed. Therefore, even if failing in reading the system data recorded in another sub-recording area selected for each two or more system data recording areas, it is possible to execute the start processing of the data storage device by reading the old system data recorded in the other sub-recording area. Moreover, the record and the confirmation of the system data are executed for only the selected one sub-recording area, and processing for the other sub-recording area that is not selected is omitted. Thus, an increase in the processing time can be reduced.

In recent years, strengthening the security function is strongly requested from the personal computer and the like, and it is necessary to surely delete the data recorded in the buffer where the system data including the password and the like is temporarily preserved. However, multiplexing of the system data is advanced, and it takes much time to delete the preserved system data when two or more system data recorded in each two or more data recording areas are read and then preserved in the buffer at a time. Especially, when the deletion of the system data doesn't end until the power supply of electronic equipment turns off, the password that remains in the buffer might be illegally acquired by the third person when the power supply of electronic equipment is turned on next.

According to the second basic form of the data storage device in the embodiment corresponding to the another aspect described in SUMMARY, the system data recorded in each two or more system data recording areas are sequentially preserved in the division area in the buffer, and two system data that are preserved earlier are compared with one another and relatively old system data is overwritten on the new system data, so that the finally latest system data is acquired. Therefore, as compared with the case that reads two or more system data at a time and preserves it in the buffer, it is possible to reduce the buffer space where the system data is recorded, and also to delete at high-speed and surely the system data preserved in the buffer after the latest system data is acquired.

As described above, according to the data storage device in the embodiments, it is possible to cope with both the reduction of the processing time to the access to the system area and the improvement of reliability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A data storage device comprising:
    a recording medium that has two or more system data recording areas on which system data are recorded on a multiple basis, and a user data recording area on which user data is recorded;
    a head that records data into the recording medium and reads data from the recording medium; and
    a system data update control section that causes the head to update the system data on the recording medium,
    wherein the system data update control section causes the head to record new system data on a multiple basis in another sub-record area that is alternately selected at each update to the new system data over the two or more system data recording areas when each the two or more system data recording areas is divided into two sub-record areas, and read the new system data from the another sub-record area to confirm that the new system data is recorded correctly.

2. The data storage device according to claim 1, wherein the system data update control section causes the head to record new system data on a multiple basis in other sub-record area that is different from the another sub-record area now selected at each update to the new system data over the two or more system data recording areas, and omits regarding the other sub-record area the confirmation that the new system data is recorded correctly.

3. The data storage device according to claim 2, wherein the data storage device further comprising:
    an access result preservation section that preserves an access result of an indication of failure when failing in update of the system data about each the two or more system data recording areas,
    and wherein the system data update control section causes the head to execute the update of the new system data regarding a system data recording area excepting a system data recording area which preserves an access result of indicating the failure in the update of the system data in the access result preservation section, of the two or more system data recording areas.

4. The data storage device according to claim 3, wherein the access result preservation section records and reads the system data on each the two or more system data recording areas, and preserves the access result, and
    the system data update control section causes the head to record new system data on a system data recording area excepting a system data recording area which preserves an access result of indicating the failure in the record and read of the system data in the access result preservation section, of the two or more system data recording areas, and read the new system data from a system data recording area which succeeds in recording of the new system data to confirm that the new system data is recorded correctly.

5. The data storage device according to claim 4, wherein the data storage device is connected with an external device, and
    wherein the data storage device further comprises:
    a success number computing section that computes number of the system data recording areas that succeed in update among the two or more system data recording areas, and
    a notification section that notifies the external device of breakdown of the data storage device when number of system data recording areas computed in the success number computing section is smaller than that of a prescribed threshold.

6. The data storage device according to claim 3, wherein the data storage device is connected with an external device, and
    wherein the data storage device further comprises:
    a success number computing section that computes number of the system data recording areas that succeed in update among the two or more system data recording areas, and
    a notification section that notifies the external device of breakdown of the data storage device when number of system data recording areas computed in the success number computing section is smaller than that of a prescribed threshold.

7. The data storage device according to claim 2, wherein the data storage device is connected with an external device, and
    wherein the data storage device further comprises:
    a success number computing section that computes number of the system data recording areas that succeed in update among the two or more system data recording areas, and
    a notification section that notifies the external device of breakdown of the data storage device when number of system data recording areas computed in the success number computing section is smaller than that of a prescribed threshold.

8. The data storage device according to claim 1, wherein the data storage device further comprising:
    an access result preservation section that preserves an access result of an indication of failure when failing in update of the system data about each the two or more system data recording areas,
    and wherein the system data update control section causes the head to execute the update of the new system data regarding a system data recording area excepting a system data recording area which preserves an access result of indicating the failure in the update of the system data in the access result preservation section, of the two or more system data recording areas.

9. The data storage device according to claim 8, wherein the access result preservation section records and reads the system data on each the two or more system data recording areas, and preserves the access result, and
    the system data update control section causes the head to record new system data on a system data recording area excepting a system data recording area which preserves an access result of indicating the failure in the record and read of the system data in the access result preservation section, of the two or more system data recording areas, and read the new system data from a system data recording area which succeeds in recording of the new system data to confirm that the new system data is recorded correctly.

10. The data storage device according to claim 9, wherein the data storage device is connected with an external device, and wherein the data storage device further comprises:
a success number computing section that computes number of the system data recording areas that succeed in update among the two or more system data recording areas, and
a notification section that notifies the external device of breakdown of the data storage device when number of system data recording areas computed in the success number computing section is smaller than that of a prescribed threshold.

11. The data storage device according to claim 8, wherein the data storage device is connected with an external device, and wherein the data storage device further comprises:
a success number computing section that computes number of the system data recording areas that succeed in update among the two or more system data recording areas, and
a notification section that notifies the external device of breakdown of the data storage device when number of system data recording areas computed in the success number computing section is smaller than that of a prescribed threshold.

12. The data storage device according to claim 1, wherein the data storage device is connected with an external device, and wherein the data storage device further comprises:
a success number computing section that computes number of the system data recording areas that succeed in update among the two or more system data recording areas, and
a notification section that notifies the external device of breakdown of the data storage device when number of system data recording areas computed in the success number computing section is smaller than that of a prescribed threshold.

13. A data storage device comprising:
a recording medium that has two or more system data recording areas on which system data are recorded on a multiple basis, and a user data recording area on which user data is recorded;
a head that records data into the recording medium and reads data from the recording medium;
a buffer that temporarily preserves system data read with the head, the buffer having two or more division areas;
a deletion section that deletes the system data recorded on the buffer; and
a system data read control section that causes the head to read the system data recorded on the two or more system data recording areas,
wherein when the system data read control section causes the head to read sequentially system data recorded on the two or more system data recording areas, and preserves sequentially the system data in the buffer, latest system data is obtained by repetition of a process in which at stage that two system data older read is preserved in the buffer, old and new of the two system data are compared with one another, and the system data since the third is overwritten on the older system data on the buffer and old and new of two system data on the buffer is compared with one another, and
the deletion section deletes data preserved in the buffer after the system data read control section obtains the latest system data.

14. The data storage device according to claim 13, wherein the system data includes a password that permits the access of the data storage device.

* * * * *